US012031783B2

(12) United States Patent
Stephenson et al.

(10) Patent No.: US 12,031,783 B2
(45) Date of Patent: Jul. 9, 2024

(54) TUBE CLEANING ROBOT

(71) Applicant: Tube Tech Industrial Limited, Rayleigh (GB)

(72) Inventors: Adam Stephenson, Rayleigh (GB); Derek Sumsion, Rayleigh (GB)

(73) Assignee: Tube Tech Industrial Ltd., Rayleigh (GB)

( * ) Notice: Subject to any disclaimer, the term of this patent is extended or adjusted under 35 U.S.C. 154(b) by 380 days.

(21) Appl. No.: 17/622,992

(22) PCT Filed: Jun. 24, 2020

(86) PCT No.: PCT/GB2020/051528
§ 371 (c)(1),
(2) Date: Dec. 27, 2021

(87) PCT Pub. No.: WO2020/260872
PCT Pub. Date: Dec. 30, 2020

(65) Prior Publication Data
US 2022/0268536 A1 Aug. 25, 2022

(30) Foreign Application Priority Data
Jun. 27, 2019 (GB) ..................................... 1909266

(51) Int. Cl.
*B08B 9/023* (2006.01)
*F28G 9/00* (2006.01)
*F28G 15/00* (2006.01)

(52) U.S. Cl.
CPC ................ *F28G 9/00* (2013.01); *B08B 9/023* (2013.01); *F28G 15/003* (2013.01); *B08B 2209/02* (2013.01)

(58) Field of Classification Search
USPC ..................................................... 134/166 C
See application file for complete search history.

(56) References Cited

U.S. PATENT DOCUMENTS 9,952,008 B2 * 4/2018 Watson .................. F22B 37/52
2007/0102902 A1 5/2007 Kahrig

FOREIGN PATENT DOCUMENTS

GB 2691726 2/2014

OTHER PUBLICATIONS

International Search Report and Written Opinion for PCT/GB2020/051528; European Patent Office; Sep. 10, 2020; entire document.

* cited by examiner

*Primary Examiner* — Cristi J Tate-Sims
(74) *Attorney, Agent, or Firm* — Allen, Dyer, Doppelt & Gilchrist, P.A.

(57) ABSTRACT

A robot is disclosed for cleaning the exterior of tubes of a heat exchanger. The robot comprises a lance for directing a jet of fluid into spaces between the tubes, a carriage for transporting the lance in a direction of travel parallel to axes of the tubes of the heat exchanger, and traction assemblies for engaging the tubes to enable the carriage to be advanced along the tubes, wherein the traction assemblies are each moveable relative to the carriage in a direction transverse to that of travel in order to change the track width of the robot.

8 Claims, 3 Drawing Sheets

TUBE CLEANING ROBOT

CROSS-REFERENCE TO RELATED APPLICATIONS

This application is the § 371 National Stage Entry of International Application No. PCT/GB2020/051528, filed on Jun. 24, 2020, which claims the benefit of Great Britain Patent Application No. 1909266.7, filed on Jun. 27, 2019, the contents of which applications are herein incorporated by reference in their entirety.

FIELD OF THE INVENTION

The invention relates to a robot for cleaning the exterior of tubes of a heat exchanger, in particular of a heat exchanger directly heated in a furnace

BACKGROUND OF THE INVENTION

In many industrial plants, such as refineries, a fluid is heated by flowing through a heat exchanger, also referred to as convection bank, comprising a bundle of tubes over which pass the flue gases of a furnace. In some cases, the tubes are bare radiant tubes having smooth outer surfaces, while in others each tube is a finned convection tube having closely spaced fins projecting from its outer surface to increase the surface area of the tube and thereby improve the heat transfer.

Because of incomplete combustion of the fuel burned in the furnace, a deposit of soot and other combustion by-products can form on the tubes or between the fins, which, if allowed to build up, causes a serious deterioration in efficiency. To maintain good performance, it is therefore necessary to clean the outer surfaces of tube bundles periodically.

There are several known technologies for cleaning the tubes including: chemical spraying, using soot blower technology which utilizes high pressure air, and fireball technology which injects an abrasive blast and chemical media into the upward draft of a flame.

EP 2691726, which is believed to represent the closest prior art to the present invention, describes a robot for cleaning the exterior of a furnace heat exchanger that includes a bundle of tubes heated by the flue gases of a heater furnace. The robot comprises a motorized carriage which is guided for movement along the outer surface of the bundle in a direction parallel to the tubes. A holder is attached to the carriage for holding a lance in a position relative to the carriage that permits the lance to penetrate between the tubes of the bundle and the lance is advanced along the heat exchanger by the carriage while remaining in the latter position.

SUMMARY OF THE INVENTION

In accordance with the invention, there is provided a robot for cleaning the exterior of tubes of a heat exchanger, the robot comprising a lance for directing a jet of fluid into spaces between the tubes, a carriage for transporting the lance in a direction of travel parallel to axes of the tubes of the heat exchanger, and traction assemblies for engaging the tubes to enable the carriage to be advanced along the tubes, characterized in that two traction assemblies being moveable relative to the carriage in a direction transverse to that of travel in order to change the track width of the robot.

In some embodiments, the two traction assemblies are moveable relative to the carriage independently of one another The invention is an improvement of the robot disclosed in EP 2691726 in that it allows the track width of the robot to be adjusted while correctly maintaining the position of the lance. Such adjustment may be required for several reasons. First, the spacing of the tubes may differ depending on the model of the furnace. Second, if the furnace has a small access hole, the traction assemblies of the robot, which are commonly the widest part, may make it more difficult to gain access to the furnace tubes through an access hole.

Furthermore, some furnaces do not have an access hole and an access hole needs to be cut into the furnace wall. It is advantageous in such cases to make the size of the access hole as small as possible to minimize the impact on the furnace efficiency. In some embodiments, the minimum track width of the robot may be even less than the width of the carriage thereby minimizing the size of the required access hole.

Once the robot has been introduced into the furnace, the track width can be set to suit the pitch of the tubes and may even be adjusted dynamically to compensate for any bending or warping of the tubes.

The traction assemblies of the robot may each comprise a sub-frame supporting a motor and two or more wheels driven by the motor. The wheels may be fitted with tires or more preferably with a continuous caterpillar track. The use of a continuous track enables maximum contact between the traction assembly and the tube of the furnace. The large contact area also reduces the risk of the robot falling from the tubes if one of the tubes is bent.

It should be made clear at this juncture that the term “track width” as used herein refers only to the separation of the points of contact between the traction assemblies and the tubes of the heat exchanger and should not be taken to imply that the traction assemblies necessarily include caterpillar tracks.

The two traction assemblies of the robot are preferably movable independently of one another in a direction transverse to the travel direction and relative to the carriage. When traversing bent tubes in particular, independent adjustment of the traction assemblies allows them both to maintain contact with the tubes, whilst at the same time not moving the position of the carriage laterally. In this way, it is possible to maintain the lance centered between adjacent tubes.

In such an embodiment, a track width adjustment mechanism may be provided for moving at least one traction assembly relative to the carriage, which adjustment mechanism comprises a threaded shaft, a mounting block having a threaded portion in threaded engagement with the shaft, and a motor for rotating one of the shaft and the mounting block to cause the block to move relative to the length of the shaft, wherein one of the shaft and the block is secured to the carriage and the other to the traction assembly.

To reduce the clearance between the carriage and the tubes, the motor of the track width adjustment mechanism may be located on an upper side of the carriage and the threaded shaft may be located on an underside of the carriage. In such an embodiment, the motor may be connected to rotate the shaft by a chain and sprocket transmission.

BRIEF DESCRIPTION OF THE DRAWINGS

The invention will now be described further, by way of example, with reference to the accompanying drawings, in which.

DETAILED DESCRIPTION OF THE DRAWINGS

Figure 1:
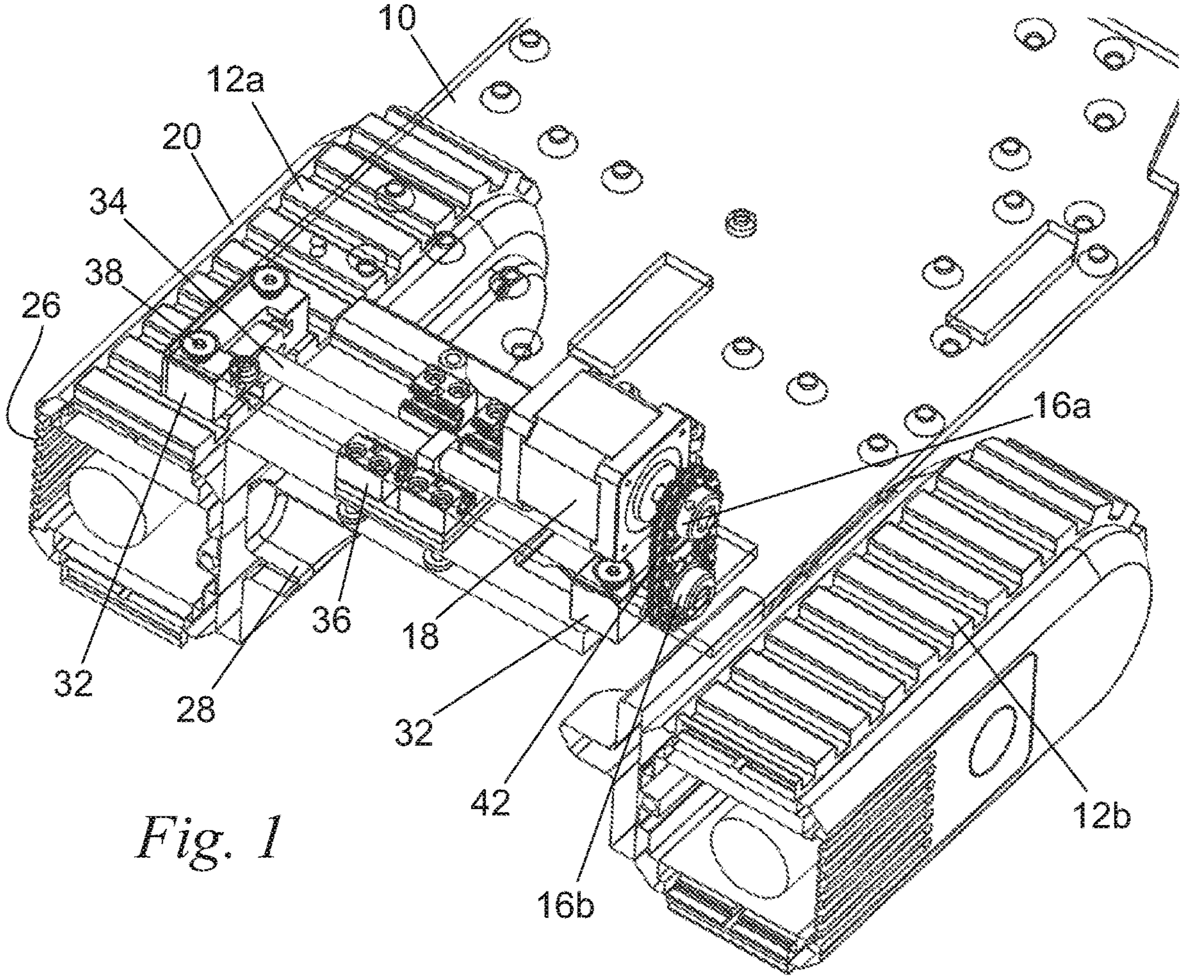
FIG. 1 is a perspective view showing the general configuration of a robot.

FIG. 1 shows a robot for cleaning the exterior of tubes in a heat exchanger of a furnace. The robot comprises a carriage 10, two traction assemblies 12*a*, 12*b*, and a track width adjustment mechanism for moving the traction assemblies 12*a*, 12*b* apart. A lance (not shown) connected to a pressurized fluid supply is pivotably mounted on the carriage 10.

The carriage 10 is a flat plate onto which other components of the robot are mounted. The carriage 10 is generally rectangular and features multiple holes for accepting screws, bolts, and nuts, or for allowing components to pass therethrough. Components attached to the carriage 10 may include covers, batteries and motors. The carriage 10 also supports sub-assemblies of the robot, including a lance sub-assembly and the traction assemblies 12*a*, 12*b*.

The lance sub-assembly (not shown) comprises a lance for emitting a fluid at high pressure, and motors for rotating and/or translating the lance in order for the lance to penetrate between the tubes of the heat exchanger and to maneuver the lance for most efficient cleaning of the tubes. The position of the lance can be set to clean between tubes located either below of above the plane of the carriage. As the lance sub-assembly is itself known, e.g., from EP2691726, it need not be described herein in detail.

Each traction assembly comprises a sub-frame 20, carrying a motor connected to drive wheels or sprockets that are fitted tires or, as shown in the drawings, with a continuous caterpillar track. The caterpillar tracks rest on top of the tubes of the heat exchanger and provide drive to move the robot along the tubes in order to clan the full length of the heat exchanger. The caterpillar tracks 12 are preferably a continuous treaded rubber belt to aid traction. Rather than caterpillar tracks, a different traction assembly may be used, using wheels in place of caterpillar tracks.

The caterpillar tracks 12 are guided around the frame 20. A drive motor (not shown) is mounted within the frame 20 of each traction assembly. An advantage to having a motor mounted within each frame 20 is that it allows for the robot to be steered along any bent tubes by driving each track 12 at a different speed or even in a different direction. A possible alternative is to use two motors mounted on the carriage 10, each connected by a respective transmission to one of the traction assemblies.

In an embodiment where steering is not required or is accomplished in another way, a single motor may drive both tracks 12. In the illustrated embodiment, the motor of each traction assembly is accessible via an access hatch 22 (best seen in FIG. 3) which is held in place by screws 24. The frame 20 may include a vent 26 (shown in FIG. 1) to reject heat produced by the motor to prevent overheating.

A bracket 28 is connected to the inner surface of each frame 20. The brackets 28 are shaped such that the robot can adopt a minimum track width configuration, in which the tracks to not project laterally beyond the carriage, without the two brackets 28 colliding or interfering with one another.

The track width adjustment mechanism comprises a screw threaded shaft 34 which is journaled at its opposite ends in two pillow blocks 32 that are secured to the carriage 10 by screws 38. The bearings in the pillow blocks may be friction bearings or may include rolling bearing elements. A mounting block 36, in screw threaded engagement with the shaft 34, is connected to the bracket 28, so that rotation of the shaft 34 results in the bracket 28 and the track assembly moving to the left or right relative to the carriage, as viewed in FIG. 2.

The pillow blocks 32, the shaft 34, and the mounting block 36 are mounted on the underside of the carriage 10. While a drive motor 18 for rotating the shaft 34 may also be mounted on the underside of the carriage, to reduce the ride height of the carriage 10, it is mounted in the illustrated embodiment on the upper side of the carriage and torque is transmitted from the motor 18 to the shaft 34 by a chain 42 passing over sprockets 16*a* and 16*b*.

The motor 18 rotates the upper sprocket 16*a*, which in turn rotates the lower sprocket 16*b* via a drive chain 42. The drive chain 42 passes through a hole in the carriage 10 between the two sprockets 16*a*, 16*b*.

The sprockets 16*a*, 16*b* may be secured for rotation with their respective shafts by any suitable means, such as a keyway, an interference fit, or splined connection.

Due to the threaded connection between the shaft 34 and the mounting block 36, rotating the shaft 34 forces the mounting block 36 to traverse the length of the shaft 34. As the mounting block 36 is connected to the bracket 28, the linear movement of the mounting block 36 translates into an equal linear movement of the track assembly 12*a* in a direction transverse to that of the direction of travel of the robot, thus enabling the track width to be adjusted. It follows that depending on which direction the motor 18 is rotated, the track 12*a* may be moved in an inward direction to reduce the track width of the robot, or in an outward direction to increase the track width of the robot.

Figure 2:
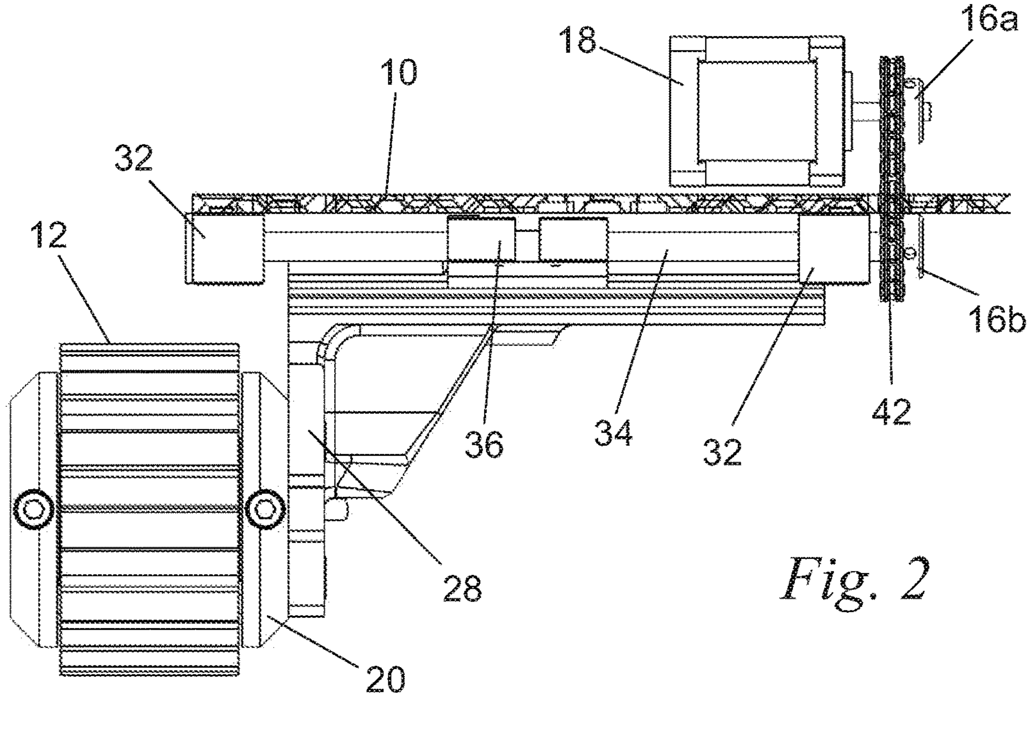
FIG. 2 is a rear view showing the mechanism for moving one of the traction assemblies of the robot.
Figure 3:
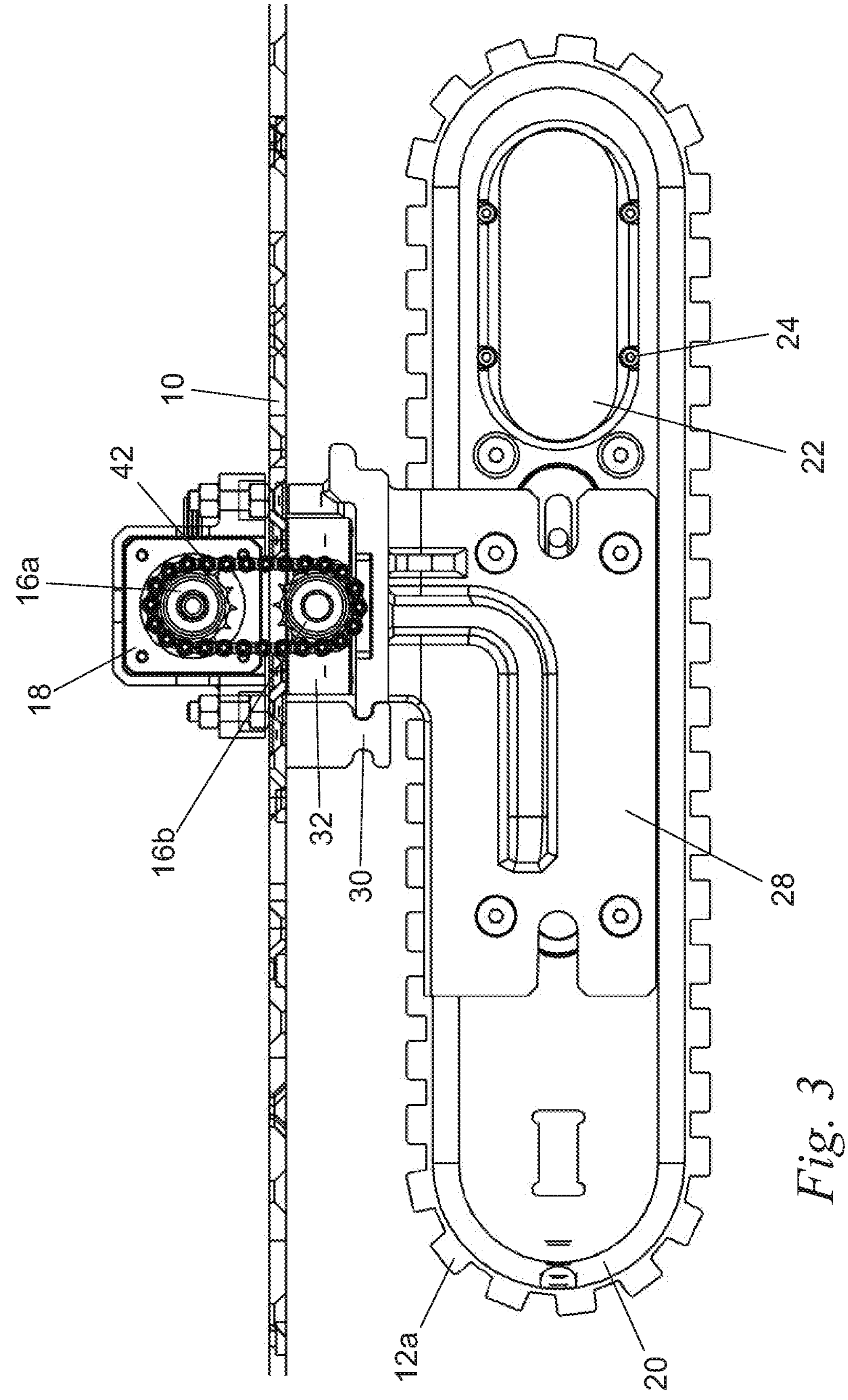
FIG. 3 is a side view of the robot.
Figure 4:
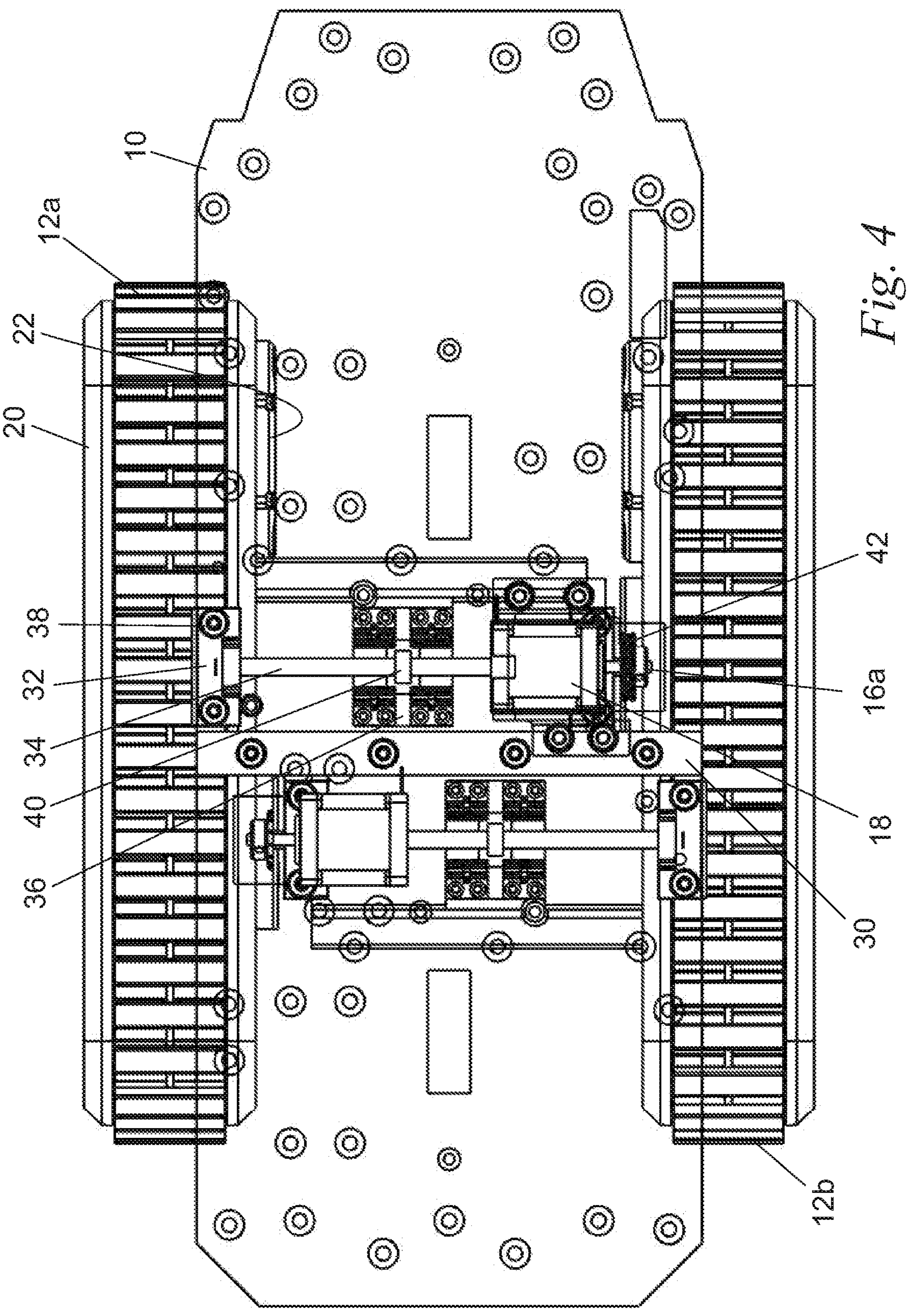
FIG. 4 is a top view of the robot illustrating mechanisms for moving the two traction assemblies separately relative to the carriage, in which, for clarity, the carriage is shown as being transparent.

The above description and FIGS. 1 to 3 explain how one traction assembly 12*a* may be moved in a direction transverse to that of the direction of travel of the robot. In an embodiment where more than one traction assembly is to be moved in a transverse direction, the same principles apply to the other traction assembly 12*b*. The overall configuration of such an embodiment is shown in FIG. 4. As each traction assembly 12*a*, 12*b* may be controlled by a completely independent system, it is possible for each traction assembly to be movable in a transverse direction independently. Alternatively, the traction assemblies could use the same motor if the tracks are to always be moved apart at the same time and by the same distance.

Having independently translatable tracks enables the robot to remain stable even traversing bent tubes. To maintain efficiently when cleaning tubes, it is important for the jet of fluid emitted from the lance to be aimed accurately and that the main body of the robot, i.e., the carriage which supports the lance, travel along a straight trajectory. Having independent control of the lateral position of each traction assembly allows this straight trajectory even in the case where, for example, only the tube under the left traction assembly 12*a* is bent outwards.

It is an advantage of having an adjustable track width that the size of the access hole required to introduce the robot into a furnace may be minimized. Even in a furnace where the tubes are widely spaced apart, the traction assemblies may be retracted to lie within the width of the carriage for introduction of the robot into the furnace and they may be subsequently be moved apart to suit the pitch of the rubes of the convection bank.

It will be clear to the person skilled in the art that various modifications may be made to the illustrated embodiments without departing from the scope of the claims as set forth in the appended claims. For example, the threaded shaft and mounting block could be replaced by a rack and pinion and if desired the same pinion may act on two racks each connected to a respective one of the traction assemblies.

The invention claimed is:

1. A robot for cleaning the exterior tubes of a heat exchanger, the robot comprising a lance for directing a jet of fluid into spaces between tubes, a carriage for transporting the lance in a direction of travel parallel to axes of the tubes of the heat exchanger, and traction assemblies for engaging the tubes to enable the carriage to be advanced along the tubes, characterized in that two traction assemblies are provided and located on opposite sides of the carriage, at least one of the traction assemblies being movable relative to the carriage in a direction transverse to that of travel in order to change a track width of the robot.

2. The robot as claimed in claim 1, wherein the two traction assemblies are moveable relative to the carriage independently of one another.

3. The robot as claimed in claim 1 wherein the traction assemblies include motor driven caterpillar tracks.

4. The robot as claimed in claim 1, wherein a track width adjustment mechanism is provided for moving each traction assembly relative to the carriage, which adjustment mechanism comprises a threaded shaft, a mounting block having a threaded portion in threaded engagement with the shaft, each of the shaft and the block being secured to a respective one of the carriage and the traction assembly, and a motor for causing relative rotation between the shaft and the mounting block to move the block along the length of the shaft and thereby move the traction assembly relative to the carriage.

5. The robot as claimed in claim 4, wherein the motor of the track width adjustment mechanism is located on an upper side of the carriage and the threaded shaft is located on an underside of the carriage.

6. The robot as claimed in claim 4, wherein the motor is connected to rotate the shaft by a chain and sprocket transmission comprising a first sprocket fixed for rotation with the motor, a second sprocket fixed for rotation with the threaded shaft, and a chain engaging both sprockets.

7. The robot as claimed in claim 4, wherein the minimum track width of the robot is less than the width of the carriage.

8. The robot as claimed in claim 1, wherein the minimum track width of the robot is less than the width of the carriage.

* * * * *